United States Patent
Li et al.

(10) Patent No.: US 10,992,722 B2
(45) Date of Patent: Apr. 27, 2021

(54) HIGH EFFICIENCY DISTRIBUTED DEVICE-TO-DEVICE (D2D) CHANNEL ACCESS

(71) Applicant: APPLE INC., Cupertino, CA (US)

(72) Inventors: Honggang Li, Beijing (CN); Qinghua Li, San Ramon, CA (US); Jong-Kae Fwu, Sunnyvale, CA (US); Xiaogang Chen, Portland, OR (US); Yuan Zhu, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/522,272

(22) Filed: Jul. 25, 2019

(65) Prior Publication Data

US 2020/0021632 A1    Jan. 16, 2020

Related U.S. Application Data

(63) Continuation of application No. 14/883,410, filed on Oct. 14, 2015, now Pat. No. 10,405,211, which is a
(Continued)

(51) Int. Cl.
*H04L 29/08*    (2006.01)
*H04L 29/06*    (2006.01)
(Continued)

(52) U.S. Cl.
CPC ...... *H04L 65/4092* (2013.01); *H04L 41/0659* (2013.01); *H04L 41/082* (2013.01);
(Continued)

(58) Field of Classification Search
None
See application file for complete search history.

(56) References Cited

U.S. PATENT DOCUMENTS

| 5,754,638 A | 5/1998 | Kusunoki |
| 6,625,227 B1 | 9/2003 | Shull et al. |

(Continued)

FOREIGN PATENT DOCUMENTS

| CN | 102244855 A | 11/2011 |
| CN | 102264036 A | 11/2011 |

(Continued)

OTHER PUBLICATIONS

"[Draft] LS on Tsp", TSG-CT-WG3: 3GPP Draft; C3-121281_LS_ON_TSP-Draft, 3rd Generation Partnership Project (3GPP), Mobile Competence Centre; 650, Route Des Lucioles ; F-06921 Sophia-Antipolis Cedex; France, vol. CT WG3, No. Kyoto, Japan; 20120521-20120525, (May 29, 2012), 2 pgs.
(Continued)

*Primary Examiner* — James P Duffy
(74) *Attorney, Agent, or Firm* — Stoel Rives LLP

(57) ABSTRACT

Techniques for facilitating device-to-device (D2D) communications using a high efficiency distributed channel access scheme are generally described herein. In some examples, a communication zone allocated for wireless D2D communications is divided into resource contention and scheduled transmission portions. The resource contention segment may be used to transmit a request message from a transmitting device to a receiving device (a request-to-send message), and transmit a response to the request message from the receiving device to the transmitting device (a clear-to-send message). The response can indicate a time for the data transmission to occur during the scheduled transmission segment. During the scheduled transmission segment, the scheduled data transmission and other D2D data transmissions among the various devices will be performed. In further examples, contention access techniques may be used
(Continued)

during the resource contention segment to manage access to the resource channel.

16 Claims, 7 Drawing Sheets

Related U.S. Application Data continuation of application No. 13/687,838, filed on Nov. 28, 2012, now Pat. No. 9,191,828.

(60) Provisional application No. 61/679,627, filed on Aug. 3, 2012.

(51) Int. Cl.
*H04L 12/24* (2006.01)
*H04L 12/26* (2006.01)

(52) U.S. Cl.
CPC ...... *H04L 41/0836* (2013.01); *H04L 43/0811* (2013.01); *H04L 65/1006* (2013.01); *H04L 65/80* (2013.01); *H04L 67/16* (2013.01); *H04L 67/36* (2013.01)

(56) References Cited

U.S. PATENT DOCUMENTS

| | | |
|---|---|---|
| 7,474,686 B2 | 1/2009 | Ho |
| 7,734,752 B2 | 6/2010 | Zuk et al. |
| 7,924,742 B2 | 4/2011 | Hanes |
| 8,155,102 B1 | 4/2012 | Hakola et al. |
| 8,213,360 B2 | 7/2012 | Koskela et al. |
| 8,359,038 B2 | 1/2013 | Hakola et al. |
| 8,447,315 B2 | 5/2013 | Hakola et al. |
| 8,520,575 B2 | 8/2013 | Doppler et al. |
| 8,554,200 B2 | 10/2013 | Ribeiro et al. |
| 8,577,363 B2 | 11/2013 | Wijting et al. |
| 8,588,690 B2 | 11/2013 | Turtinen et al. |
| 8,588,803 B2 | 11/2013 | Hakola et al. |
| 8,666,403 B2 | 3/2014 | Yu et al. |
| 8,755,316 B2 | 6/2014 | Aschan et al. |
| 8,761,099 B2 | 6/2014 | Charbit et al. |
| 8,775,944 B2 | 7/2014 | Hayton |
| 8,909,265 B2 | 12/2014 | Xu et al. |
| 8,913,518 B2 | 12/2014 | Heo et al. |
| 8,973,088 B1 | 3/2015 | Leung et al. |
| 8,989,729 B2 | 3/2015 | Barclay et al. |
| 9,036,603 B2 | 5/2015 | Johnsson et al. |
| 9,100,160 B2 | 8/2015 | Martinez Tarradell et al. |
| 9,125,076 B2 | 9/2015 | Lehane |
| 9,191,828 B2 | 11/2015 | Li et al. |
| 9,301,083 B2 | 3/2016 | Jain |
| 9,363,702 B2 | 6/2016 | He et al. |
| 9,554,296 B2 | 1/2017 | Rao et al. |
| 10,405,211 B2 | 9/2019 | Li et al. |
| 2002/0006123 A1* | 1/2002 | Angelico ............ H04W 40/246 370/348 |
| 2002/0045428 A1 | 4/2002 | Chesson |
| 2004/0170217 A1 | 9/2004 | Ho |
| 2004/0258040 A1 | 12/2004 | Joshi et al. |
| 2005/0043045 A1 | 2/2005 | Cheng et al. |
| 2005/0190772 A1 | 9/2005 | Tsai et al. |
| 2007/0129076 A1 | 6/2007 | Cho et al. |
| 2008/0045178 A1 | 2/2008 | Venkatachalam |
| 2008/0052769 A1 | 2/2008 | Leone et al. |
| 2008/0318607 A1 | 12/2008 | Torsner et al. |
| 2009/0005057 A1* | 1/2009 | Lee ................. H04W 72/0446 455/450 |
| 2009/0016232 A1 | 1/2009 | Kwon et al. |
| 2009/0207817 A1 | 8/2009 | Montemurro et al. |
| 2009/0323571 A1* | 12/2009 | Arvind ............... H04L 1/0083 370/311 |
| 2010/0009675 A1 | 1/2010 | Wijting et al. |
| 2010/0009690 A1 | 1/2010 | Jin et al. |
| 2010/0026802 A1 | 2/2010 | Titus et al. |
| 2010/0110897 A1 | 5/2010 | Chun et al. |
| 2010/0150082 A1 | 6/2010 | Shin et al. |
| 2010/0238984 A1 | 9/2010 | Sayana et al. |
| 2010/0265904 A1 | 10/2010 | Yang et al. |
| 2010/0317345 A1 | 12/2010 | Futaki et al. |
| 2011/0106952 A1 | 5/2011 | Doppler et al. |
| 2011/0134774 A1 | 6/2011 | Pelletier et al. |
| 2011/0170420 A1 | 7/2011 | Xi et al. |
| 2011/0250892 A1 | 10/2011 | Gupta et al. |
| 2011/0256894 A1 | 10/2011 | Khandelia et al. |
| 2011/0268006 A1 | 11/2011 | Koskela et al. |
| 2011/0280155 A1 | 11/2011 | Shi |
| 2011/0292854 A1 | 12/2011 | Terry et al. |
| 2011/0306349 A1 | 12/2011 | Hakola et al. |
| 2011/0317559 A1 | 12/2011 | Kern et al. |
| 2011/0317571 A1 | 12/2011 | Kokkinen et al. |
| 2012/0011247 A1 | 1/2012 | Mallik et al. |
| 2012/0030358 A1 | 2/2012 | Mackenzie |
| 2012/0039273 A1 | 2/2012 | Nam et al. |
| 2012/0057476 A1 | 3/2012 | Chan et al. |
| 2012/0106517 A1 | 5/2012 | Charbit et al. |
| 2012/0140743 A1 | 6/2012 | Pelletier et al. |
| 2012/0155355 A1 | 6/2012 | Kwon et al. |
| 2012/0176950 A1 | 7/2012 | Zhang et al. |
| 2012/0182962 A1 | 7/2012 | Patil et al. |
| 2012/0184306 A1 | 7/2012 | Zou et al. |
| 2012/0190331 A1 | 7/2012 | Ahmed et al. |
| 2012/0198233 A1 | 8/2012 | George et al. |
| 2012/0202508 A1 | 8/2012 | Toth et al. |
| 2012/0213183 A1 | 8/2012 | Chen et al. |
| 2012/0214504 A1* | 8/2012 | Zha ................... H04W 24/08 455/456.1 |
| 2012/0250520 A1 | 10/2012 | Chen et al. |
| 2012/0252481 A1 | 10/2012 | Anpat et al. |
| 2012/0309447 A1 | 12/2012 | Mustajarvi et al. |
| 2013/0012221 A1 | 1/2013 | Zou et al. |
| 2013/0021968 A1 | 1/2013 | Reznik et al. |
| 2013/0064138 A1 | 3/2013 | Hakola et al. |
| 2013/0077484 A1 | 3/2013 | Zhao et al. |
| 2013/0083653 A1 | 4/2013 | Jain et al. |
| 2013/0115983 A1 | 5/2013 | Rönneke et al. |
| 2013/0115993 A1 | 5/2013 | Jain et al. |
| 2013/0155948 A1 | 6/2013 | Pinheiro et al. |
| 2013/0155954 A1 | 6/2013 | Wang et al. |
| 2013/0155962 A1 | 6/2013 | Hakola et al. |
| 2013/0160101 A1 | 6/2013 | Hakola et al. |
| 2013/0170351 A1 | 7/2013 | Reznik et al. |
| 2013/0182607 A1 | 7/2013 | Kim et al. |
| 2013/0223352 A1 | 8/2013 | Sartori et al. |
| 2013/0223356 A1 | 8/2013 | Khoshnevis et al. |
| 2013/0250910 A1 | 9/2013 | Liao et al. |
| 2013/0273855 A1 | 10/2013 | Cherian et al. |
| 2013/0279372 A1 | 10/2013 | Jain et al. |
| 2013/0288732 A1 | 10/2013 | Beale |
| 2014/0004867 A1 | 1/2014 | Noh et al. |
| 2014/0011505 A1 | 1/2014 | Liao |
| 2014/0022898 A1 | 1/2014 | Kim et al. |
| 2014/0025804 A1 | 1/2014 | Mongazon-cazavet et al. |
| 2014/0029530 A1 | 1/2014 | Kim et al. |
| 2014/0036774 A1 | 2/2014 | Lehane et al. |
| 2014/0036793 A1 | 2/2014 | Johnsson et al. |
| 2014/0036795 A1 | 2/2014 | Martinez Tarradell et al. |
| 2014/0036876 A1 | 2/2014 | Li et al. |
| 2014/0038549 A1 | 2/2014 | Lehane et al. |
| 2014/0040504 A1 | 2/2014 | Gupta |
| 2014/0050160 A1 | 2/2014 | Rönneke et al. |
| 2014/0086144 A1 | 3/2014 | Foti et al. |
| 2014/0092808 A1 | 4/2014 | Jain et al. |
| 2014/0112251 A1 | 4/2014 | Kim et al. |
| 2014/0113609 A1 | 4/2014 | Elloumi et al. |
| 2014/0134996 A1 | 5/2014 | Barclay et al. |
| 2014/0171091 A1 | 6/2014 | Cai et al. |
| 2014/0177583 A1 | 6/2014 | Aso et al. |
| 2014/0185467 A1 | 7/2014 | Heo et al. |
| 2014/0269779 A1 | 9/2014 | Shan et al. |
| 2014/0286162 A1 | 9/2014 | Kim et al. |
| 2014/0307632 A1 | 10/2014 | Kim et al. |
| 2015/0023164 A1 | 1/2015 | Starsinic et al. |

(56) References Cited

U.S. PATENT DOCUMENTS

| | | |
|---|---|---|
| 2015/0036672 A1 | 2/2015 | Kim et al. |
| 2015/0049732 A1 | 2/2015 | Xue et al. |
| 2015/0057006 A1 | 2/2015 | Gao et al. |
| 2015/0139197 A1 | 5/2015 | He et al. |
| 2015/0172909 A1 | 6/2015 | Chandramouli et al. |
| 2015/0173016 A1 | 6/2015 | Heo et al. |
| 2015/0181564 A1 | 6/2015 | Rao et al. |
| 2015/0208450 A1 | 7/2015 | Mademann et al. |
| 2015/0215977 A1 | 7/2015 | Yamazaki |
| 2015/0271623 A1 | 9/2015 | Kim et al. |
| 2016/0007390 A1 | 1/2016 | Starsinic et al. |
| 2016/0100441 A1 | 4/2016 | Li et al. |
| 2016/0134401 A1* | 5/2016 | Pajukoski .............. H04J 11/005 370/329 |

FOREIGN PATENT DOCUMENTS

| | | |
|---|---|---|
| CN | 102365897 A | 2/2012 |
| CN | 102388666 A | 3/2012 |
| CN | 102427604 A | 4/2012 |
| CN | 102547871 A | 7/2012 |
| CN | 103582006 A | 2/2014 |
| CN | 103582066 A | 2/2014 |
| CN | 104412524 A | 3/2015 |
| CN | 104429141 A | 3/2015 |
| CN | 104429147 A | 3/2015 |
| CN | 104471876 A | 3/2015 |
| CN | 106028464 A | 10/2016 |
| CN | 104429147 B | 2/2019 |
| EP | 2421306 A1 | 2/2012 |
| EP | 2566199 A1 | 3/2013 |
| EP | 2880781 A1 | 6/2015 |
| EP | 2880782 A | 6/2015 |
| EP | 2880943 A1 | 6/2015 |
| EP | 2880952 | 6/2015 |
| EP | 2880955 A | 6/2015 |
| EP | 2905991 A1 | 8/2015 |
| ES | 2439623 A2 | 1/2014 |
| ES | 2440391 A2 | 1/2014 |
| ES | 2439623 R1 | 3/2014 |
| ES | 2440391 R1 | 3/2014 |
| ES | 2447215 A2 | 3/2014 |
| ES | 2473415 A2 | 7/2014 |
| ES | 2481265 R1 | 10/2014 |
| ES | 2507465 A1 | 10/2014 |
| ES | 2508390 A1 | 10/2014 |
| ES | 2510290 A1 | 10/2014 |
| ES | 2512965 A1 | 10/2014 |
| ES | 2473415 R1 | 11/2014 |
| ES | 2523417 A1 | 11/2014 |
| ES | 2523474 A1 | 11/2014 |
| ES | 2525773 A1 | 12/2014 |
| ES | 2447215 R1 | 1/2015 |
| FR | 2994361 A1 | 2/2014 |
| HK | 1207751 A1 | 2/2016 |
| KR | 20110049622 A | 5/2011 |
| KR | 1020110052426 A | 5/2011 |
| KR | 1020110086758 A | 7/2011 |
| KR | 1020110093642 A | 8/2011 |
| KR | 1020120031546 A | 4/2012 |
| KR | 1020120061881 A | 6/2012 |
| KR | 1020120070444 A | 6/2012 |
| KR | 1020120071676 A | 7/2012 |
| KR | 1020120074251 A | 7/2012 |
| KR | 1020120074255 A | 7/2012 |
| TW | 201410054 A | 3/2014 |
| TW | 201419898 A | 5/2014 |
| WO | WO-0163946 A1 | 8/2001 |
| WO | WO-2010028690 A1 | 3/2010 |
| WO | WO-2010080966 A1 | 7/2010 |
| WO | WO-2010130870 A1 | 11/2010 |
| WO | WO-2011088406 A1 | 7/2011 |
| WO | WO-2011119680 A2 | 9/2011 |
| WO | WO-2011121374 A1 | 10/2011 |
| WO | WO-2011131666 A1 | 10/2011 |
| WO | WO-2011134329 A1 | 11/2011 |
| WO | WO-2011139043 A2 | 11/2011 |
| WO | WO-2011160682 A1 | 12/2011 |
| WO | WO-2012016378 A1 | 2/2012 |
| WO | WO-2012028076 A1 | 3/2012 |
| WO | WO-2012056209 A1 | 5/2012 |
| WO | WO-2012061770 A2 | 5/2012 |
| WO | WO-2012066189 A1 | 5/2012 |
| WO | WO-2012068731 A1 | 5/2012 |
| WO | WO-2012077977 A2 | 6/2012 |
| WO | WO-2012087009 A2 | 6/2012 |
| WO | WO-2012091420 A2 | 7/2012 |
| WO | WO-2013185841 A1 | 12/2013 |
| WO | WO-2014021984 A1 | 2/2014 |
| WO | WO-2014021987 A1 | 2/2014 |
| WO | WO-2014021989 A1 | 2/2014 |
| WO | WO-2014021990 A1 | 2/2014 |
| WO | WO-2014021998 A2 | 2/2014 |
| WO | WO-2014021998 A3 | 2/2014 |
| WO | WO-2014022769 A1 | 2/2014 |
| WO | WO-2014022776 A1 | 2/2014 |
| WO | WO-2014022797 A1 | 2/2014 |

OTHER PUBLICATIONS

"3rd Generation Partnership Project; Technical Specification Group Core Network and Terminals; Access Network Discovery and Selection Function (ANDBF) Management Object (MO) (Release 11)", 3GPP, 3GPP Draft; DRAPT_24312-B30,3rd Generation Partnership Project.(3GPP), Mobile Competence Centre ; 650, Route Des Lucioles ; M&921 Sophia Antîroub Cedex; France, (Jun. 15, 2015), 162 pgs.

"3rd Generation Partnership Project; Technical Specification Group Core Network and Terminals; Access Network Discovery and Selection Function (ANDSF) Management Object (MO) (Release 11)", 3GPP TS 24.312 V11.3.0, (2012), 162 pgs.

"3rd Generation Partnership Project; Technical Specification Group Core Network and Terminals; Access Network Discovery and Selection Function (ANDSF) Management Object (MO) (Release 11)", ETSI TS 24.312 Version 11.6.0, (Mar. 15, 2013), 174 pgs.

"3rd Generation Partnership Project; Technical Specification Group Core Network and Terminals; Access Network Discovery and Selection Function (ANDSF) Management Object (MO) (Release 11)", ETSI TS 24.312 Version 11.3.0, (Jun. 27, 2012), 163 pgs.

"3rd Generation Partnership Project; Technical Specification Group Core Network and Terminals; Tsp interface protocol between the MTC Interworking Function (MTC-IWF) and Service Capability Server (SCS) (Release 11)", 3GPP Standard; 3GPP TS 29.368, 3rd Generation 3GPP Standard; 3GPP TS 29.368, 3rd Generation; 650, Route Des Lucioles ; F-06921 Sophia-Antipolis Cedex; France, vol. CT WG1, No. V1.0.0,, (Jun. 6, 2012), 1-17.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, (Dec. 2012), 340 pgs.

"3rd Generation Partnership Project; Technical Specification Group Services and System Aspects; Architecture enhancements to facilitate Communications with packet data networks and applications (Release 11)", 3gpp Draft; 23682-010-CI, 3rd Generationpartnership Project (3GPP), Mobile Competence Centre ; 650, Route Des Lucioles ; F-06921 Sophia-Antipolis Cedex ; France, (Jul. 6, 2012), 27 pgs.

"3rd Generation Partnership Project; Technical Specification Group Services and System Aspects; Data Identification in Access Network Discovery and Selection Function (ANDSF) (DIDA) (Release 11)", 3GPP TR 23.855 V11.0.0, (2012), 11 pgs.

"Access Network Discovery and Selection Function (ANDSF) Management Object", Universal Mobile Telecommunications System (UMTS); LTE;, (Jul. 2012), 72-155.

"Access Network Discovery and Selection Function (ANDSF) Management Object MO", 3GPP TS 24.312 V11.4.0. Technical Specification Group Core Network and Terminals. Release 11., (Sep. 2012), 168 pgs.

(56) References Cited

OTHER PUBLICATIONS

"U.S. Appl. No. 13/687,838, Final Office Action dated Apr. 10, 2015", 36 pgs.
"U.S. Appl. No. 13/687,838, Non Final Office Action dated Nov. 26, 2014", 31 pgs.
"U.S. Appl. No. 13/687,838, Notice of Allowance dated Jul. 16, 2015", 17 pgs.
"U.S. Appl. No. 13/687,838, Response filed Feb. 26, 2015 to Non Final Office Action dated Nov. 26, 2014", 13 pgs.
"U.S. Appl. No. 13/687,838, Response filed Jun. 10, 2015 to Final Office Action dated Apr. 10, 2015", 15 pgs.
"U.S. Appl. No. 13/711,338, Advisory Action dated Oct. 7, 2015", 3 pgs.
"U.S. Appl. No. 13/711,338, Applicant Interview Summary dated Aug. 25, 2014", 2 pgs.
"U.S. Appl. No. 13/711,338, Examiner Interview Summary dated May 4, 2015", 3 pgs.
"U.S. Appl. No. 13/711,338, Examiner Interview Summary dated Aug. 21, 2014", 2 pgs.
"U.S. Appl. No. 13/711,338, Final Office Action dated Jul. 14, 2015", 14 pgs.
"U.S. Appl. No. 13/711,338, Non Final Office Action dated Feb. 4, 2015", 16 pgs.
"U.S. Appl. No. 13/711,338, Preliminary Amendment filed Mar. 15, 2013", 6 pgs.
"U.S. Appl. No. 13/711,338, Response filed May 4, 2015 to Non Final Office Action dated Feb. 4, 2015", 16 pgs.
"U.S. Appl. No. 13/711,338, Response filed Sep. 24, 2015 to Final Office Action dated Jul. 14, 2015", 10 pgs.
"U.S. Appl. No. 13/718,745, Examiner Interview Summary dated Sep. 16, 2014", 3 pgs.
"U.S. Appl. No. 13/718,745, Non Final Office Action dated Aug. 7, 2014", 19 pgs.
"U.S. Appl. No. 13/718,745, Notice of Allowance dated Jan. 21, 2015", 12 pgs.
"U.S. Appl. No. 13/718,745, Response filed Sep. 30, 2014 to Non Final Office Action dated Aug. 7, 2014", 16 pgs.
"U.S. Appl. No. 13/729,117, Notice of Allowance dated Aug. 12, 2014", 14 pgs.
"U.S. Appl. No. 13/790,630, Final Office Action dated Feb. 3, 2015", 16 pgs.
"U.S. Appl. No. 13/790,630, Non Final Office Action dated Sep. 5, 2014", 17 pgs.
"U.S. Appl. No. 13/790,630, Notice of Allowance dated Mar. 31, 2015", 7 pgs.
"U.S. Appl. No. 13/790,630, Response filed Jan. 5, 2015 to Non Final Office Action dated Sep. 5, 2014", 9 pgs.
"U.S. Appl. No. 13/790,630, Response filed Mar. 17, 2015 to Final Office Action dated Feb. 3, 2015", 10 pgs.
"U.S. Appl. No. 14/124,984, Non Final Office Action dated May 5, 2016", 20 pgs.
"U.S. Appl. No. 14/124,984, Notice of Allowance dated Sep. 12, 2016", 11 pgs.
"U.S. Appl. No. 14/124,984, Preliminary Amendment filed Dec. 9, 2013", 11 pgs.
"U.S. Appl. No. 14/124,984, Response filed Aug. 3, 2016 to Non Final Office Action dated May 5, 2016", 17 pgs.
"U.S. Appl. No. 14/125,973, Preliminary Amendment filed Dec. 13, 2013", 3 pgs.
"U.S. Appl. No. 14/126,983, Examiner Interview Summary dated Jan. 15, 2016", 3 pgs.
"U.S. Appl. No. 14/126,983, Final Office Action dated Nov. 19, 2015", 9 pgs.
"U.S. Appl. No. 14/126,983, Non Final Office Action dated Jun. 3, 2015", 10 pgs.
"U.S. Appl. No. 14/126,983, Notice of Allowance dated Feb. 4, 2016", 5 pgs.
"U.S. Appl. No. 14/126,983, Preliminary Amendment filed Dec. 17, 2013", 8 pgs.
"U.S. Appl. No. 14/126,983, Response filed Jan. 19, 2016 to Final Office Action dated Nov. 19, 2015", 7 pgs.
"U.S. Appl. No. 14/126,983, Response filed Sep. 3, 2015 to Non Final Office Action dated Jun. 3, 2015", 9 pgs.
"U.S. Appl. No. 14/126,983, Supplemental Notice of Allowability dated Feb. 19, 2016", 2 pgs.
"U.S. Appl. No. 14/126,983, Supplemental Notice of Allowability dated Mar. 31, 2016", 2 pgs.
"U.S. Appl. No. 14/126,983, Supplemental Notice of Allowability dated Apr. 12, 2016", 2 pgs.
"U.S. Appl. No. 14/570,555, Non Final Office Action dated Sep. 10, 2015", 18 pgs.
"U.S. Appl. No. 14/570,555, Preliminary Amendment filed Mar. 2, 2015", 9 pgs.
"U.S. Appl. No. 14/695,930, Preliminary Amendment filed Jul. 16, 2015", 8 pgs.
"U.S. Appl. No. 14/883,410, Advisory Action dated Aug. 27, 2018", 4 pgs.
"U.S. Appl. No. 14/883,410, Advisory Action dated Sep. 27, 2017", 5 pgs.
"U.S. Appl. No. 14/883,410, Advisory Action dated Dec. 8, 2016", 4 pgs.
"U.S. Appl. No. 14/883,410, Final Office Action dated Jun. 2, 2017", 21 pgs.
"U.S. Appl. No. 14/883,410, Final Office Action dated Jun. 4, 2018", 21 pgs.
"U.S. Appl. No. 14/883,410, Final Office Action dated Sep. 9, 2016", 17 pgs.
"U.S. Appl. No. 14/883,410, Non Final Office Action dated Jan. 10, 2018", 19 pgs.
"U.S. Appl. No. 14/883,410, Non Final Office Action dated Jan. 12, 2017", 17 pgs.
"U.S. Appl. No. 14/883,410, Non Final Office Action dated Feb. 26, 2016", 44 pgs.
"U.S. Appl. No. 14/883,410, Non Final Office Action dated Oct. 1, 2018", 20 pgs.
"U.S. Appl. No. 14/883,410, Notice of Allowability dated May 22, 2019", 3 pgs.
"U.S. Appl. No. 14/883,410, Notice of Allowability dated Jul. 18, 2019", 3 pgs.
"U.S. Appl. No. 14/883,410, Notice of Allowance dated Apr. 10, 2019", 5 pgs.
"U.S. Appl. No. 14/883,410, Preliminary Amendment filed Dec. 21, 2015", 8 pgs.
"U.S. Appl. No. 14/883,410, Respnse filed Apr. 12, 2017 to Non Final Office Action dated Jan. 12, 2017", 10 pgs.
"U.S. Appl. No. 14/883,410, Response filed Jan. 4, 2019 to Non Final Office Action dated Oct. 1, 2018", 12 pgs.
"U.S. Appl. No. 14/883,410, Response filed Apr. 10, 2018 to Non Final Office Action dated Jan. 10, 2018", 10 pgs.
"U.S. Appl. No. 14/883,410, Response filed Jul. 20, 2018 to Final Office Action dated Apr. 4, 2018", 11 pgs.
"U.S. Appl. No. 14/883,410, Response Filed Jul. 20, 2018 to Final Office Action dated Jun. 4, 2018", 11 pgs.
"U.S. Appl. No. 14/883,410, Response filed Aug. 18, 2017 to Final Office Action dated Jun. 2, 2017", 10 pgs.
"U.S. Appl. No. 14/883,410, Response filed Oct. 18, 2017 to Final Office Action dated Jun. 2, 2017", 10 pgs.
"U.S. Appl. No. 14/883,410, Response filed Nov. 7, 2016 to Final Office Action dated Sep. 9, 2016", 10 pgs.
"U.S. Appl. No. 14/883,410, Response filed Dec. 9, 2016 to Final Office Action dated Sep. 9, 2016", 11 pgs.
"U.S. Appl. No. 14/883,410, Response filed May 26, 2016 to Non Final Office Action dated Feb. 26, 2016", 8 pgs.
"Application-ID", Qualcomm Incorporated, C1-122886, Change Request 24.312 CR 0098 rev—Current Version: 11.3.0 3GPP TSG-CT WG 1 Meeting #79, (2012), 1-14.
"Application-ID, C1-122866, Change Request 24,312 CR 0098 rev—Current version: 11.3.0 3GPP TSG-CT WG1 Meeting #79", Qualcomm: Incorporated, Chicago (USA), [Online] retrieved from the internet: <URL:http://www.3gpp.org/ftp/tsg_ct/WG1_mm-cc-sm_ex-CN1/TSGC1_79_Chicago//docs>, (Jul. 30, 2012), 1-15.

(56) References Cited

OTHER PUBLICATIONS

"Australian Application Serial No. 2013297042, Non Final Office Action dated Jun. 3, 2015", 3 pgs.
"Belgian Application Serial No. 2013/0521, Search Report dated May 15, 2015", W/ English Search Report, 11 pgs.
"Belgium Application Serial No. 2013/0522, Office Action dated May 11, 2015", W/ English Search Report, 12 pgs.
"Change Request", 3GPP TSG-CT WG1 Meeting #79. C1-123455. Revision of C1-123435, C1-123079, C1-122886., (Aug. 6, 2012), 97 pgs.
"Change Request", 3GPP TSG-CT WG1 Meeting #80. C1-123965., (Oct. 2012), 15 pgs.
"Chinese Application Serial No. 201380035348.8, Office Action dated Mar. 7, 2018", W/Concise Statement of Relevance, 7 pgs.
"Chinese Application Serial No. 201380035348.8, Office Action dated Aug. 1, 2018", w/o English translation, 6 pgs.
"Chinese Application Serial No. 201380035348.8, Response filed Dec. 4, 2017 to Office Action dated Jul. 19, 2017", w/ English Claims, 28 pgs.
"Chinese Application Serial No. 201380035966.2, Office Action dated Jan. 22, 2017", w/English Translation, 7 pgs.
"Chinese Application Serial No. 201380035966.2, Office Action dated Jul. 24, 2017", W/ English Translation, 10 pgs.
"Chinese Application Serial No. 201380035966.2, Office Action dated Dec. 27, 2017", (English Translation), 10 pgs.
"Chinese Application Serial No. 201380035966.2, Response filed Mar. 9, 2018 to Office Action dated Dec. 27, 2017", w/ English Claims, 46 pgs.
"Chinese Application Serial No. 201380035966.2, Response filed Nov. 27, 2017Office Action dated Jul. 24, 2017", w/ English Claims, 13 pgs.
"Chinese Application Serial No. 201380036520.1, Office Action dated Apr. 28, 2018", w/ English translation, 4 pgs.
"Chinese Application Serial No. 201380036520.1, Office Action dated Aug. 1, 2017", W/ English translation, 10 pgs.
"Chinese Application Serial No. 201380036520.1, Response filed Jan. 16, 2018 to Office Action dated Aug. 1, 2017", w/ English claims, 59 pgs.
"Chinese Application Serial No. 201380036520.1, Response filed Jul. 13, 2018 to Office Action dated Apr. 28, 2018", w/ English claims, 59 pgs.
"Chinese Application Serial No. 201610281428.7, Office Action dated Mar. 5, 2019", W/ Concise Statement of Relevance, 5 pgs.
"Chinese Application Serial No. 201610281428.7, Response filed Jan. 28, 2019 to Office Action dated Nov. 22, 2018", w/ English claims, 15 pgs.
"Discussion on OS type leaf", Qualcomm Incorporated, C1-122076, 3GPP TSG CT WG1 Meeting #78, (May 2012), 3 pgs.
"European Application Serial No. 13825698.7, Communication Pursuant to Article 94(3) EPC dated Jun. 4, 2019", 5 pgs.
"European Application Serial No. 13825698.7, Extended European Search Report dated Mar. 15, 2016", 9 pgs.
"European Application Serial No. 13825698.7, Response Filed Jan. 31, 2019 to Communication Pursuant to Article 94(3) EPC dated Oct. 8, 2018", 16 pgs.
"European Application Serial No. 13825698.7, Response filed Oct. 14, 2016 to Extended European Search Report dated Mar. 15, 2016", 23 pgs.
"European Application Serial No. 13825940.3, Extended European Search Report dated May 3, 2016", 6 pgs.
"European Application Serial No. 13825940.3, Response filed Nov. 23, 2016 to Extended European Search Report dated May 3, 2016", 22 pgs.
"European Application Serial No. 13826192.0, Extended European Search Report dated Jun. 22, 2016", 9 pgs.
"European Application Serial No. 13826192.0, Partial Supplementary European Search Report dated Feb. 8, 2016", 7 pgs.
"European Application Serial No. 13826192.0, Response filed Jan. 18, 2017 to Extended European Search Report dated Jun. 22, 2016", 9 pgs.
"Evolved Universal Terrestrial Radio Access (E-UTRA); Medium Access Control (MAC) protocol specification", 3GPP TS 36.321 V10.5.0. Technical Specification Group Radio Access Network. Release 10., (Mar. 2012), 54 pgs.
"Evolved Universal Terrestrial Radio Access (E-UTRA); Radio Resource Control (RRC); Protocol specification", 3GPP TS 36.331 V11.5.0. Technical Specification Group Radio Access Network. Release 11., (Sep. 2013), 347 pgs.
"Finland Application Serial No. 20135806, Office Action dated Aug. 15, 2014", 7 pgs.
"Finland Application Serial No. 20135807, Office Action dated Mar. 26, 2015", in English, 8 pgs.
"International Application Serial No. PCT/US2013/044139, International Preliminary Report on Patentability dated Feb. 12, 2015", 7 pgs.
"International Application Serial No. PCT/US2013/044139, International Search Report dated Sep. 16, 2013", 3 pgs.
"International Application Serial No. PCT/US2013/044139, Written Opinion dated Sep. 16, 2013", 5 pgs.
"International Application Serial No. PCT/US2013/044384, International Search Report dated Nov. 15, 2013", 3 pgs.
"International Application Serial No. PCT/US2013/044384, Written Opinion dated Nov. 15, 2013", 5 pgs.
"International Application Serial No. PCT/US2013/044445, International Preliminary Report on Patentability dated Feb. 12, 2015", 11 pgs.
"International Application Serial No. PCT/US2013/044445, International Search Report dated Sep. 16, 2013", 3 pgs.
"International Application Serial No. PCT/US2013/044445, Written Opinion dated Sep. 16, 2013", 9 pgs.
"International Application Serial No. PCT/US2013/044530, International Preliminary Report on Patentability dated Feb. 12, 2015", 9 pgs.
"International Application Serial No. PCT/US2013/044530, International Search Report dated Sep. 4, 2013", 3 pgs.
"International Application Serial No. PCT/US2013/044530, Written Opinion dated Sep. 4, 2013", 7 pgs.
"International Application Serial No. PCT/US2013/044543, International Preliminary Report on Patentability dated Feb. 12, 2015", 10 pgs.
"International Application Serial No. PCT/US2013/044543, International Search Report dated Aug. 27, 2013", 4 pgs.
"International Application Serial No. PCT/US2013/044543, Written Opinion dated Aug. 27, 2013", 8 pgs.
"International Application Serial No. PCT/US2013/045656, International Preliminary Report on Patentability dated Feb. 12, 2015", 12 pgs.
"International Application Serial No. PCT/US2013/045656, International Search Report dated Apr. 15, 2014", 3 pgs.
"International Application Serial No. PCT/US2013/045656, Written Opinion dated Apr. 15, 2014", 10 pgs.
"International Application Serial No. PCT/US2013/053420, International Preliminary Report on Patentability dated Feb. 12, 2015", 6 pgs.
"International Application Serial No. PCT/US2013/053420, International Search Report dated Dec. 2, 2013", 3 pgs.
"International Application Serial No. PCT/US2013/053420, Written Opinion dated Dec. 2, 2013", 4 pgs.
"International Application Serial No. PCT/US2013/053428, International Preliminary Report on Patentability dated Feb. 12, 2015", 10 pgs.
"International Application Serial No. PCT/US2013/053428, International Search Report dated Dec. 19, 2013", 4 pgs.
"International Application Serial No. PCT/US2013/053428, Written Opinion dated Dec. 19, 2013", 8 pgs.
"International Application Serial No. PCT/US2013/053470, International Preliminary Report on Patentability dated Feb. 12, 2015", 6 pgs.
"International Application Serial No. PCT/US2013/053470, International Search Report dated Nov. 21, 2013", 3 pgs.
"International Application Serial No. PCT/US2013/053470, Written Opinion dated Nov. 21, 2013", 4 pgs.

(56) References Cited

OTHER PUBLICATIONS

"Korean Application Serial No. 2014-7036954, Reasons for Rejection dated Jul. 24, 2015", W/ English Translation, 9 pgs.
"Netherlands Application Serial No. 2011257, Search Report and Written Opinion dated Mar. 18, 2014", W/ English Translation, 11 pgs.
"Netherlands Application Serial No. 2011259, Search Report dated Jun. 13, 2014", 2 pgs.
"Netherlands Application Serial No. 2011259, Written Opinion dated Jun. 13, 2014", 8 pgs.
"Non-Access Stratum (NAS) configuration Management Object (MO)", 3GPP TS 24.368 V11.2.0. Technical Specification Group Core Network and Terminals. Release 11., (Sep. 2012), 13 pgs.
"SA WG2 meeting #86 S2-113680", solution of suppressing device trigger, 3GPP,, (Jul. 15, 2011), 6 pgs.
"Spanish Application Serial No. 201331212, Office Action dated Mar. 2, 2015", W/ English References, 1 pg.
"Spanish Application Serial No. 201331212, Office Action dated Jul. 14, 2015", W/ English Translation, 8 pgs.
"Spanish Application Serial No. 201331212, Search Report dated Oct. 27, 2014", W/ English References, 4 pgs.
"Spanish Application Serial No. 201331212, Written Opinion dated Oct. 27, 2014", W/ English Translation, 10 pgs.
"Spanish Application Serial No. P201331208, Response filed Feb. 6, 2015 to Office Action dated Sep. 22, 2014", W/ English Claims, 18 pgs.
"Spanish Application Serial No. P201331208, Search Report dated Sep. 22, 2014", W/ English Search Report, 5 pgs.
"Spanish Application Serial No. P201331208, Written Opinion dated Sep. 22, 2014", W/ English Translation, 4 pgs.
"Sweden Application Serial No. 1350931-0, Office Action dated Dec. 29, 2014", w/ English Claims, 16 pgs.
"Sweden Application Serial No. 1350932-8, Office Action dated Jan. 21, 2015", W/ English Translation, 5 pgs.
"T5 based downlink small data transfer without establishing RRC security", CATT; 3GPP Draft: S2-122826 T5 Based Downlink Small Data Transfer Without Establishing RRC Security, 3rd Generation Partnership Project (3GPP), SA WG2 Meeting #92, Mobile Competence Centre; 650, Route Des Lucioles: F-06921 Sophia-Antipolis Cedex; France deel SA Wg2, nr. Barcelona, Spain,, (Jul. 13, 2012), 3 pgs.
"Taiwanese Application Serial No. 102127609, Office Action dated Dec. 1, 2014", w/ English Translation, 15 pgs.
"Taiwanese Application Serial No. 102127609, Response filed Jun. 3, 2015 to Office Action dated Dec. 1, 2014", W/ English Claims, 55 pgs.
"Taiwanese Application Serial No. 102127618, Office Action dated Dec. 1, 2014", W/ English Translation, 20 pgs.
"Taiwanese Application Serial No. 102127618, Response filed Mar. 2, 2015 to Office Action dated Dec. 1, 2014", W/ English Claims, 10 pgs.
"Technical Specification Group Radio Access Network; Evolved Universal Terrestrial Radio Access Network (E-UTRAN); S1 Application Protocol (S1AP)", 3GPP TS 36.413 V11.2.1 (Release 11), (Feb. 2013), 272 pgs.
"Transfer and update of solution of small data transfer in NAS signalling", Vodafone, [RIM ?]; 3GPP Draft; S2-123414 Rev 3112 Small Data by NAS, 3rd Generation Partnership Project (3GPP), Mobile Competence Centre; 650, Route Des Lucioles; F-06921 Sophia-Antipolis Cedex; France, (Jul. 2012), 7 pgs.
"Use of generic NAS transport for small data", ZTE, Intel, Interdigital; 3GPP Draft; s2-123416, 3rd Generation Partnership Project (3GPP), Mobile Competence Centre; 650, Route Des Lucioles; F-06921 Sophia-Antipolis Cedex; deel SA Wg2, nr. Barcelona, Spain, (Jul. 2012), 7 pgs.
Abraham, Santosh, et al., "Efficient Device and Service Discovery for Peer-to-Peer (P2P) scenarios", IEEE 802.11-11/1517r0, (Oct. 25, 2011), 15 pgs.
Doppler, Klaus, et al., "Device-to-Device Communication as an Underlay to LTE-Advanced Networks", IEEE Communications Magazine, 47(12), (Dec. 2009), 42-49.
Ericson, Juniper, et al., "Device triggering procedure", 3GPP TSG-CT WG3 Meeting #69. C3-120956., [Online] retrieved from the internet<http://v9ww.3gpp.org/ftp/tsg_ct/WG3_interworking_ex-CN3/TSGC3_69JKyoto/Docs/>, (May 21, 2012), 4 pgs.
Ericsson, et al., "Control Signaling in Support of CoMP", 3GPP TSG-RAN WG1 #69. R1-122843. 3rd Generation Partnership Project (3GPP), Mobile Competence Centre ; 650, Route Des Lucioles ; F-06921 Sophia-Antipolis Cedex ; France, vol. RAN WG1, No. Prague, Czech Republic, (May 21, 2012), 3 pgs.
Fodor, Gabor, et al., "Design Aspects of Network Assisted Device-to-Device Communications", IEEE Communications Magazine, vol. 50, Issue 3, (Mar. 2012), 170-177.
Intel, "ISRPs based on Application Identity", 3GPP TSG-CT WG1 Meeting #79. C1-122989., (Jul. 30, 2012), 14 pgs.
Levy, Joseph, et al., "WLAN and Cellular Interworking and Discovery Use Case", IEEE 11-12/0346r0, (Mar. 9, 2012), 11 pgs.
Mobility, Motorola, et al., "Conclusions for Traffic Identification based on Application", (Nov. 2011), 6 pgs.
Pekka, Janis, et al., "Interference-aware resource allocation for device-to-device radio underlaying cellular networks", IEEE, (2009), 5 pgs.
Zulhasnine, Mohammad, et al., "Efficient Resource Allocation for Device-to-Device Communication Underlaying LTE Network", IEEE 6th International Conference on Wireless and Mobile Computing, Networking and Communications, (2010), 368-375.

\* cited by examiner

HIGH EFFICIENCY DISTRIBUTED DEVICE-TO-DEVICE (D2D) CHANNEL ACCESS

PRIORITY APPLICATION

This application is a continuation of U.S. patent application Ser. No. 14/883,410, filed Oct. 14, 2015, which is a continuation of U.S. patent application Ser. No. 13/687,838, filed Nov. 28, 2012, now issued as U.S. Pat. No. 9,191,828, which claims priority to U.S. Provisional Patent Application Ser. No. 61/679,627, filed on Aug. 3, 2012, all of which are hereby incorporated by reference in their entirety.

TECHNICAL FIELD

Embodiments pertain to operations and communications performed by communicating devices in wireless networks. Some embodiments relate to device-to-device (D2D) communications between devices facilitated by a wireless network.

BACKGROUND

D2D wireless communication techniques may be used to offload data communications and perform peer-to-peer communications among mobile devices and networks. D2D communications between mobile devices (e.g., user equipment (UEs)) are generally designed to complement the use of centralized communications from a wireless base station (e.g., centralized station-to-mobile communications from an evolved NodeB (eNodeB) in a 3GPP Long Term Evolution/Long Term Evolution-Advanced (LTE/LTE-A) network). D2D communications can reuse spectrum in licensed communication bands and channels used by a centralized network. Complexity exists, however, when scheduling and coordinating the D2D communications with the centralized network and independently operating devices.

For example, with certain 3GPP LTE/LTE-A standards, a time-frequency zone ("D2D zone") may be allocated by the eNodeB for D2D communications. Within the D2D zone, contention-based channel access techniques may be used to manage distributed device access to D2D communication resources. Contention-based channel access helps to minimize the scheduling and control overhead on the common interface used by the eNodeB and multiple D2D UEs. Some contention-based methods, such as Carrier Sense Multiple Access with Collision Avoidance (CSMA/CA), are not efficient, however in terms of the contention overhead and power consumption due to packet collisions and channel monitoring.

DETAILED DESCRIPTION

Figure 1:
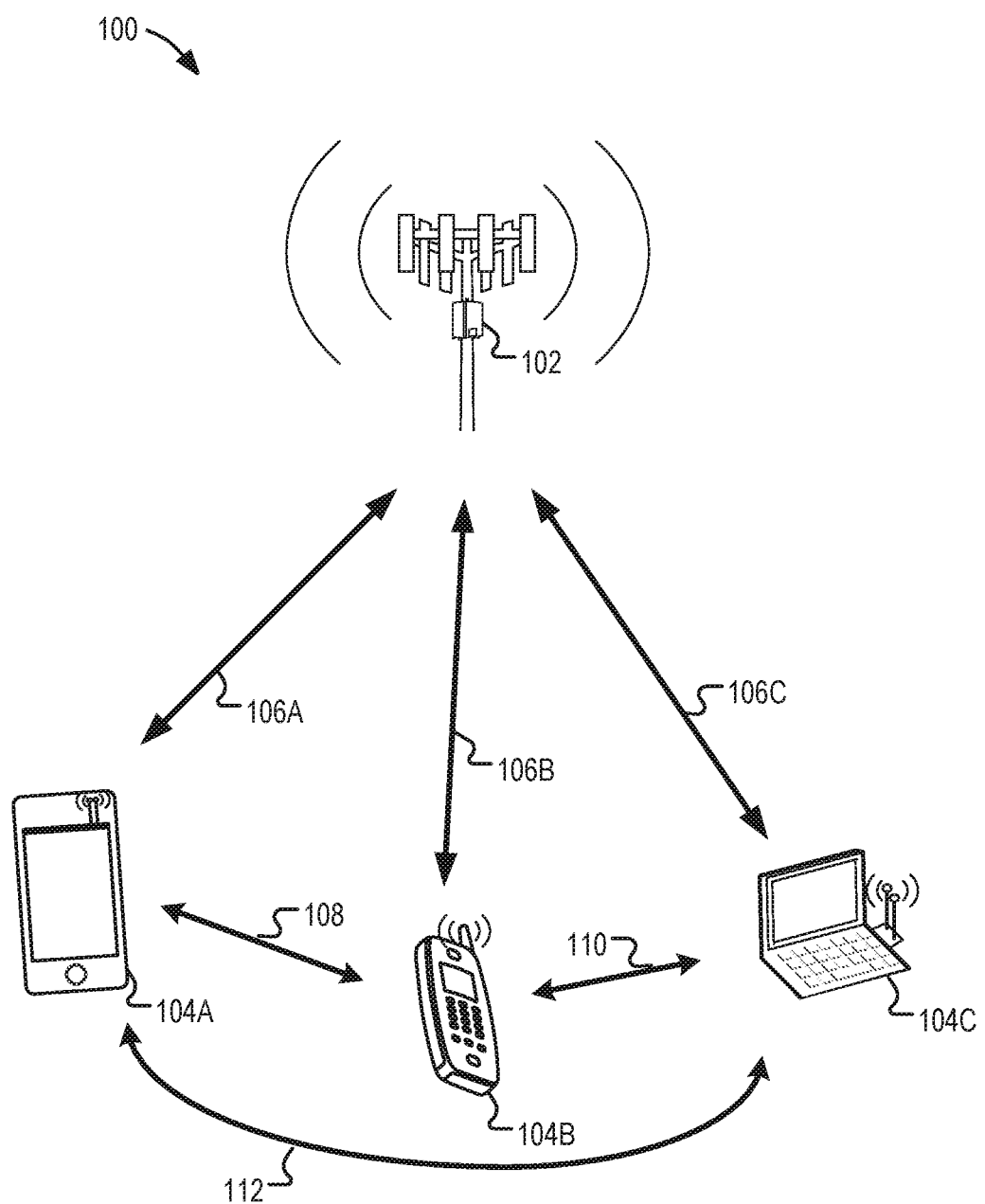
FIG. 1 includes a diagram of a D2D configuration for wireless communications among carrier network-connected devices according to a further described example.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations described herein provide for an efficient contention-based channel access scheme for D2D wireless communications. This contention-based channel access scheme may be deployed in assigned or allocated D2D communication zones or segments, such as in a D2D communication zone allocated in a carrier-based wireless communication network. The contention-based channel access scheme described herein for the D2D communications also incorporates use of scheduling techniques to coordinate the performance of the data transferred requested by the contention procedure.

In one example, the D2D communication zone is allocated into a resource allocation segment (e.g., a Random Access Channel (RACH) time period) and a scheduled communication segment (e.g., a Scheduled (SCH) time period). During the resource allocation segment, a series of request and acknowledgment messages such as a request-to-send (RTS) message and clear-to-send (CTS) message may be exchanged between devices. The RTS message may be sent by a transmitting device in the resource allocation segment to request resources in the D2D zone to perform a wireless transmission. The CTS message may be sent in response to the RTS message, to indicate a scheduled time (in the scheduled communication segment) when a receiving device will monitor the resource to receive the wireless transmission. At the scheduled time during the scheduled communication segment, the transmitting device and the receiving device can perform the D2D wireless communication.

The D2D communication techniques described herein provide a joint contention and scheduling mechanism that addresses deficiencies of exclusive contention or scheduling techniques. One commonly used contention technique, CSMA/CA, is deployed in communications for wireless networks such as IEEE 802.11 standard-compliant implementations. CSMA/CA implementations typically use a backoff counter to wait a random number of slots to help find an opportunity to send the data packet. If the channel is idle, then a packet is sent.

The D2D communication technique described herein enables the actual data transmission to be scheduled and reserved. This ensures that a particular data packet can be transmitted without interference, while using contention-based techniques to request the scheduling. This enables a method which can transform the original contention mechanism into a distributed scheduling mechanism, to cause less contention and network pollution. Further, use of the distributed scheduling mechanism enables multiple pairs of devices to exchange data in a scheduled window. Information from the scheduling window can be used to further coordinate power usage, communications, and other aspects of the D2D wireless network.

FIG. 1 illustrates a D2D networking configuration 100 for wireless communications among carrier network-connected devices 104A, 104B, 104C according to a further described example. As illustrated, a carrier-based network (e.g., a LTE/LTE-A cell network operating according to a standard from a 3GPP standards family) is established by a carrier network system 102 (e.g., an eNodeB) with mobile devices 104A, 104B, 104C (e.g., user equipment (UE)). The carrier-based network includes network connections 106A, 106B, 106C to the mobile devices 104A, 104B, 104C, respectively. The mobile devices 104A, 104B, 104C are illustrated as conforming to a variety of form factors, including a smartphone 104A, a mobile phone handset 104B, and a personal computer (PC) 104C having an integrated or external wireless network communication device.

The D2D communications may be performed among the various mobile devices 104A, 104B, 104C using the contention and scheduling techniques for D2D connections described herein. Pairs of D2D-capable communication devices can talk to each other, and may be co-located in a same area. Specifically, a D2D connection 108 may be established between smartphone 104A and mobile phone 104B; a D2D connection 110 may be established between mobile phone 104B and personal computer 104C; and a D2D connection 112 may be established between smartphone 104A and personal computer 104C.

The carrier-based network controlled by the carrier network system 102 may be used to facilitate operations of the D2D connections 108, 110, 112. The carrier-based network (and various devices, subsystems, and components within the carrier-based network, such as an eNodeB) may schedule or coordinate a communication window and timing for allowed D2D capabilities. The carrier network system 102 may also communicate availability and connection details among the various mobile devices 104A, 104B, 104C, and indicate the type of data to be communicated using the D2D connections, or when usage of the D2D connections is required or encouraged. The D2D connections 108, 110, 112 may be conducted among the receiving devices 104A, 104B, 104C using the same or different communication frequencies and spectrum as that of the carrier-based network. This may include licensed or unlicensed spectrum using the same network protocol (e.g., a network protocol operating according to a LTE, LTE-A, or other 3GPP standard) or other network protocols (e.g., a network protocol operating according to a standard from an IEEE 802.11 or 802.16 standards family, or a Bluetooth standard promulgated from the Bluetooth Special Interest Group).

Figure 2A:
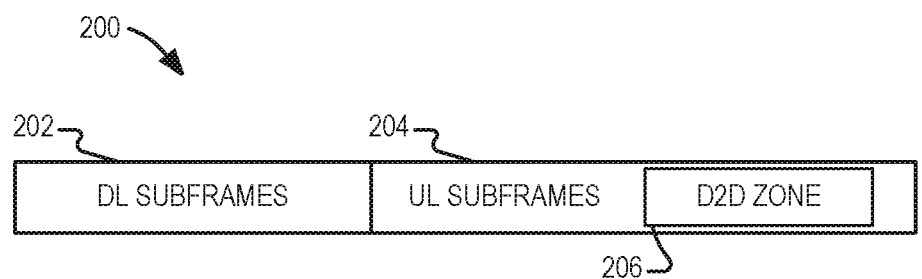
FIG. 2A illustrates a block diagram of a D2D communication space ("D2D Zone") allocated in a wireless communication frame according to a further described example.

FIG. 2A illustrates a block diagram of a D2D communication space allocated in a wireless communication frame 200 according to a further described example. As depicted, the wireless communication frame 200 may include a downlink segment 202, including a set of downlink subframes, and an uplink segment 204, including a series of uplink subframes. The uplink segment 204 may be further segmented to include resources allocated for D2D communications. As illustrated, this segment allocated for D2D communications is referred to herein as the "D2D Zone" 206. Any D2D wireless transmissions among the various mobile devices 104A, 104B, 104C may be configured to start and end within the D2D Zone 206.

Figure 2B:
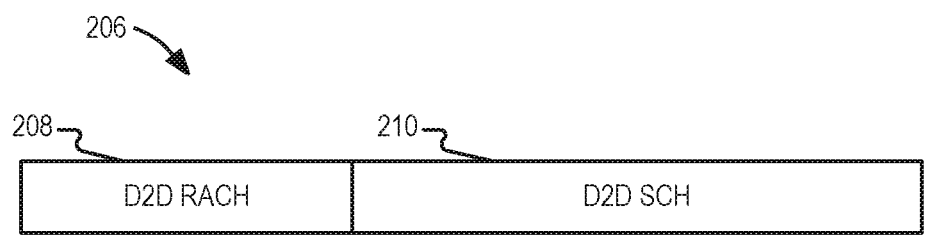
FIG. 2B illustrates a block diagram of a D2D communication space ("D2D Zone") having random access contention and scheduled communication divisions according to a further described example.

FIG. 2B illustrates a block diagram of an example D2D communication space (the D2D Zone 206) having random access contention and scheduled communication divisions according to a further described example. In a frame-based time-frequency area, the D2D Zone 206 may be defined and partitioned in a time domain as shown in FIG. 2B. The random access contention segment of the D2D Zone 206 is referred to herein as the D2D random access channel "D2D RACH" segment 208. The scheduled communication segment of the D2D Zone 206 is referred to herein as the D2D shared channel "D2D SCH" segment 210. Although not illustrated, the D2D Zone 206 also may be further segmented or partitioned for other purposes.

In one example implementation, all contentions for D2D communication resource occur only in the D2D RACH segment 208. This results in only a small number of possible D2D devices (the winners of the contention) actively communicating in the D2D SCH segment 210. Use of a contention resource in the D2D RACH segment 208 followed by scheduling in the D2D SCH segment 210 enables devices to effectively coordinate operations, particularly where a large number of potential devices may be communicating.

Limiting contention to the D2D RACH segment 208 and actual data transmissions to the D2D SCH segment 210 may be used to retain the flexibility of contention-based D2D communication, while enabling the reduction of power consumption for many devices. For example, D2D devices not involved with a scheduled communication may choose to enter a power-saving or reduced communication mode during the duration of the D2D SCH segment 210. Likewise, D2D devices which are involved with a scheduled communication during only a portion of the D2D SCH segment 210 may choose to wake from a low power state on an as-needed basis (and re-enter the low power state) according to the schedule.

In contrast, the power consumption of devices implementing various contention techniques such as CSMA/CA may be much higher than with the presently described technique. This is because with the use of CSMA/CA, each active device is generally required to be active at all times, to detect the received packets over the wireless channel (and prevent the device from missing a packet addressed to it). Scheduling multiple D2D transmissions, one at a time within a scheduling window, enables many D2D devices to reduce power and channel monitoring requirements.

Figure 3:
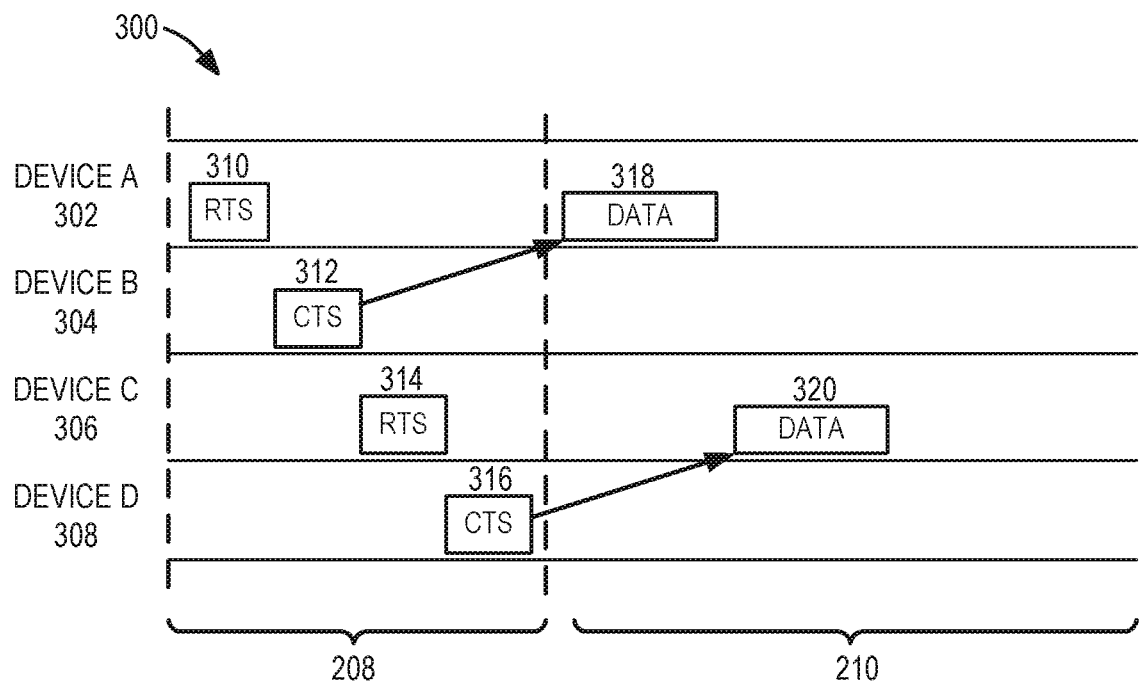
FIG. 3 illustrates a time-based diagram of D2D communications including random access contention and scheduled communications for multiple devices according to a further described example.

FIG. 3 illustrates a time-based diagram 300 of D2D communications including random access contention and scheduled communications for multiple devices 302, 304, 306, 308 (in the D2D Zone 206 or other designated D2D communication time) according to a further described example. As depicted, Device A 302 and Device C 306 each are intended to schedule transmissions (318, 320) to Device B 304 and Device D 308 respectively.

During the D2D RACH segment 208, all active D2D devices 302, 304, 306, 308 monitor the channel for potential transmission or reception. In the example of FIG. 3, there is a request-to-send message 310 transmitted by Device A 302 to indicate a request to perform a data transmission to Device B 304, and a request-to-send message 314 transmitted by Device C 306 to indicate a request to perform a data transmission to Device D 308. These request-to-send messages 310, 314 used to invoke responses in the form of a clear-to-send message 312 from Device B 304, and a clear-to-send message 316 from Device D 308.

During the D2D RACH Segment 208, the device implements a contention-based technique to manage channel access for multiple transmissions over the wireless communication medium. This may be performed through the use of a collision avoidance technique with the generation of a backoff time for a busy channel, similar to use of a CSMA/CA technique. When the backoff time expires, and time remains within the D2D RACH segment 208, a transmitting device may send a request-to-send message to a receiving device. If a receiving device receives the request-to-send message successfully, the receiving device may respond by a clear-to-send message.

The clear-to-send response message is distinguishable from existing CSMA/CA mechanisms used in IEEE 802.11 or other wireless network standards, due to the inclusion of an explicit transmission or scheduling time in the response message. The transmission time, denoted as time-to-send, may be specified in a clear-to-send message such that a transmitting device knows when to turn on its transmitter to send the packet (e.g., with Device A's data transmission 318 during D2D SCH segment 210). Further, the clear-to-send message may be used to inform other listening/receiving devices in the network whether the scheduled channel will be in use by the communicating devices.

When a contention mechanism indicates that previous use of the contention channel is now concluded (such as a backoff time expires for Device C 306 in the D2D RACH channel 208, and the channel is detected as being available), Device C 306 may send a request-to-send message 314 to Device D 316. A time-to-send indication is specified in this message. If Device D 308 receives the request-to-send message successfully, Device D 308 will respond by a clear-to-send message 316 with a time-to-send indication to inform both Device C 306 and other listening devices (e.g., Device A 302, Device B 304) of the transmission time for Device C's data transmission 320.

The size of the request-to-send/clear-to-send message packet may be configured to be small to conserve bandwidth and resources. The request-to-send/clear-to-send message may be configured to only provide a simple indication of how much time to reserve (in the request-to-send packet) and what time is reserved (in the clear-to-send response packet). Device neighbors of the transmitting and receiving devices can also observe the request-to-send/clear-to-send packets to learn about the scheduling and specific time reservation. In contrast, with use of request-to-send/clear-to-send packets in IEEE 802.11 standard networks, there is no such information on scheduling or timing within the clear-to-send message packet. Rather, the clear-to-send message in IEEE 802.11 standard networks is used to invoke immediate transmission of data and not a scheduled transmission of data in a separate time window.

Thus, request-to-send/clear-to-send packets are exchanged in the D2D RACH segment 208, and scheduling is established for the actual data transmission(s) over the wireless channel in the D2D SCH segment 210. This enables active and observing devices to know exact transmission times and keep track of channel usage. During the duration of the D2D SCH segment 210, only successfully scheduled devices involved in transmission and receipt in the D2D RACH segment 208 need to be powered and active at the scheduled time. For example, when it is the time for Devices A and B 302, 304 to transmit and receive with data communication 318, Devices C and D 306, 308 can enter or maintain a sleep/power-saving mode to minimize power consumption. Likewise, Devices A and B 302, 304 can enter or maintain a sleep/power-saving mode during the time that devices C and D 306, 308 communicate with data transmission 320.

Figure 4:
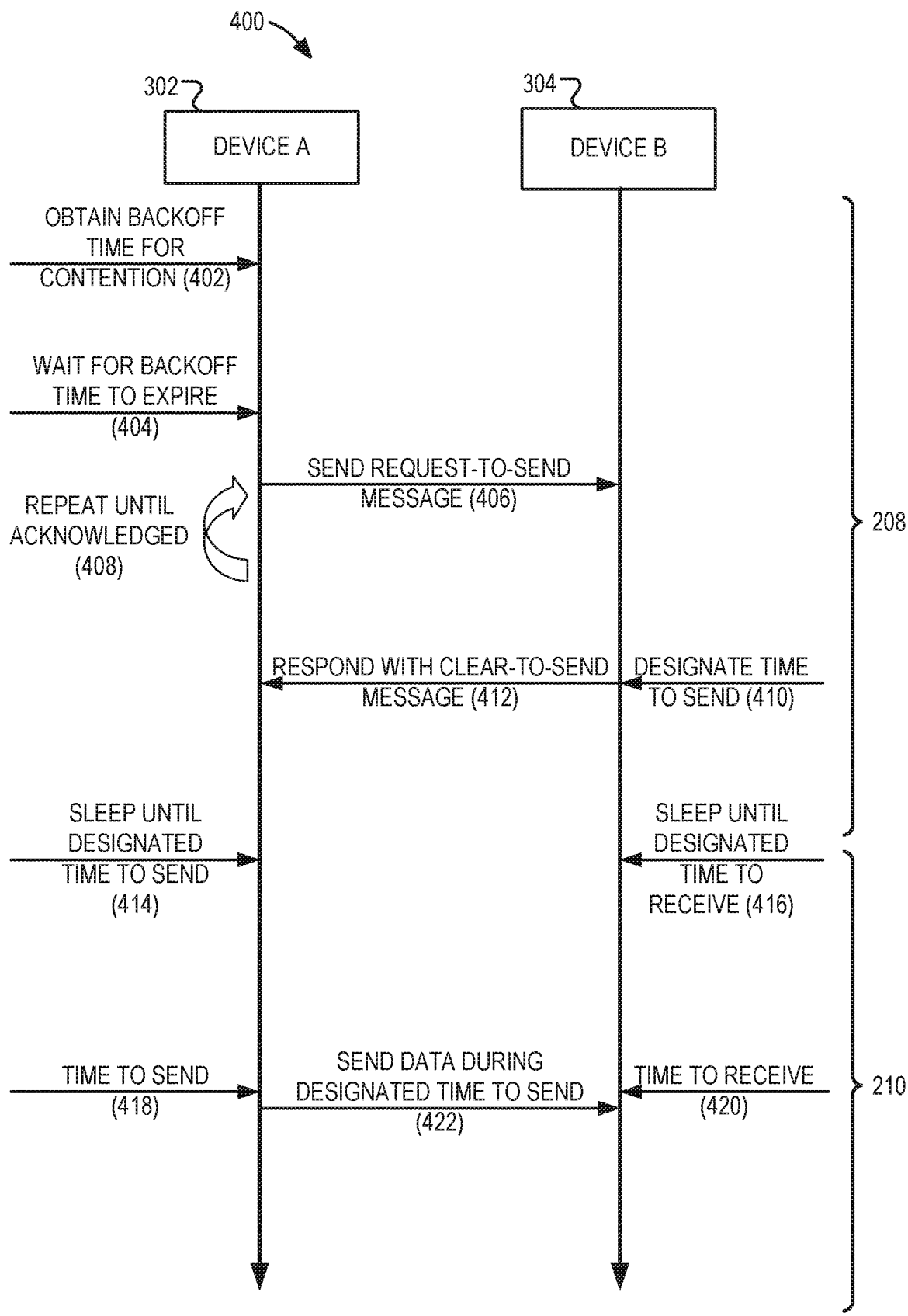
FIG. 4 illustrates an operation flow for D2D communications including random access contention and scheduled communications between two devices according to a further described example.

FIG. 4 illustrates an operation flow 400 for D2D communications including random access contention and scheduled communications between two devices (Device A 302 and Device B 304) according to a further described example. During the D2D RACH segment 208, both Device A 302 and Device B 304 are configured to listen to the wireless communication medium for any signaling.

Device A 302 obtains access to the D2D RACH segment 208 using a contention access technique. As illustrated, this may include a CSMA/CA-type of backoff technique, including obtaining a backoff time (operation 402) and waiting for the backoff time to expire (operation 404). Device A 302 sends the request-to-send (RTS) message (operation 406) to Device B 304, repeating the RTS message until acknowledged (operation 408) or until a specified number of tries is exceeded (unless the D2D RACH segment 208 has concluded).

Device B 304 responds by sending a clear-to-send message (operation 412), indicating a designated time-to-send (operation 410) of when Device A 302 can start to send data packets of the data transmission. Upon the conclusion of the D2D RACH segment 208 and the start of the D2D SCH segment 210, Device A 302 and Device B 304 may enter sleep modes until the designated time to send (operation 414) and time to receive (operation 416) respectively. At the time to send (operation 418) and the time to receive (operation 420), the data can be transmitted over the wireless medium from Device A 302 to Device B 304.

The time to send (designated in operation 410) may be indicated by an offset time t1 from the start of the D2D SCH segment 210. The offset time t1 can be defined in some resolved time unit of the carrier network, e.g. a number of time slots. (Likewise, when another device, such as Device D 308 of FIG. 3, sends a clear-to-send response, the clear-to-send response message may indicate when Device C 306 of FIG. 3 can start to send data packets, at an offset time t2 from the start of the D2D SCH Segment 210).

The boundary between the D2D RACH segment 208 and the D2D SCH segment 210 can be set explicitly or implicitly. Restated, the amount of time for actual scheduled transmissions, versus contention for the scheduled transmission, can be fixed or adjusted. For explicit definition, this boundary can be defined by the eNodeB, another other network entity, or set according to pre-defined rules for D2D communications.

For implicit definition, the boundary can be adjusted by D2D devices in each frame (e.g., during each D2D RACH segment 208, or for multiple frames using one scheduling effective for N number of frames). The boundary may be adjusted based upon the successful channel reservations that are known to all devices. The last device that sends a request-to-send message can calculate if the duration of the D2D RACH segment 208 plus the duration of the D2D SCH segment 210, including the outstanding request, might exceed the D2D Zone 206. If the answer is no (which means there is enough time remaining in the D2D Zone 206 to conduct the request and the data transmission), the transmitting device can send a request-to-send message. Thus, the boundary of the D2D RACH segment 208 and the D2D SCH segment 210 can be set automatically after the reception of a clear-to-send message sent from the last device in the D2D RACH segment 208.

Before providing a request-to-send message or a response to the request-to-send (a clear-to-send message), the devices may perform a calculation to ensure that the duration of all scheduled data transmissions will not exceed the D2D zone boundary. If the total transmission will exceed the D2D zone boundary, the transmission(s) may be split up, or the transmission(s) may be rescheduled to another D2D zone. D2D devices may know or may be informed of the size (duration) of available D2D zone resources (e.g., how many time slots exist for usage with the D2D communications). Thus, D2D devices or UEs can decide scheduling of a shared channel by themselves using distributive techniques.

Figure 5:
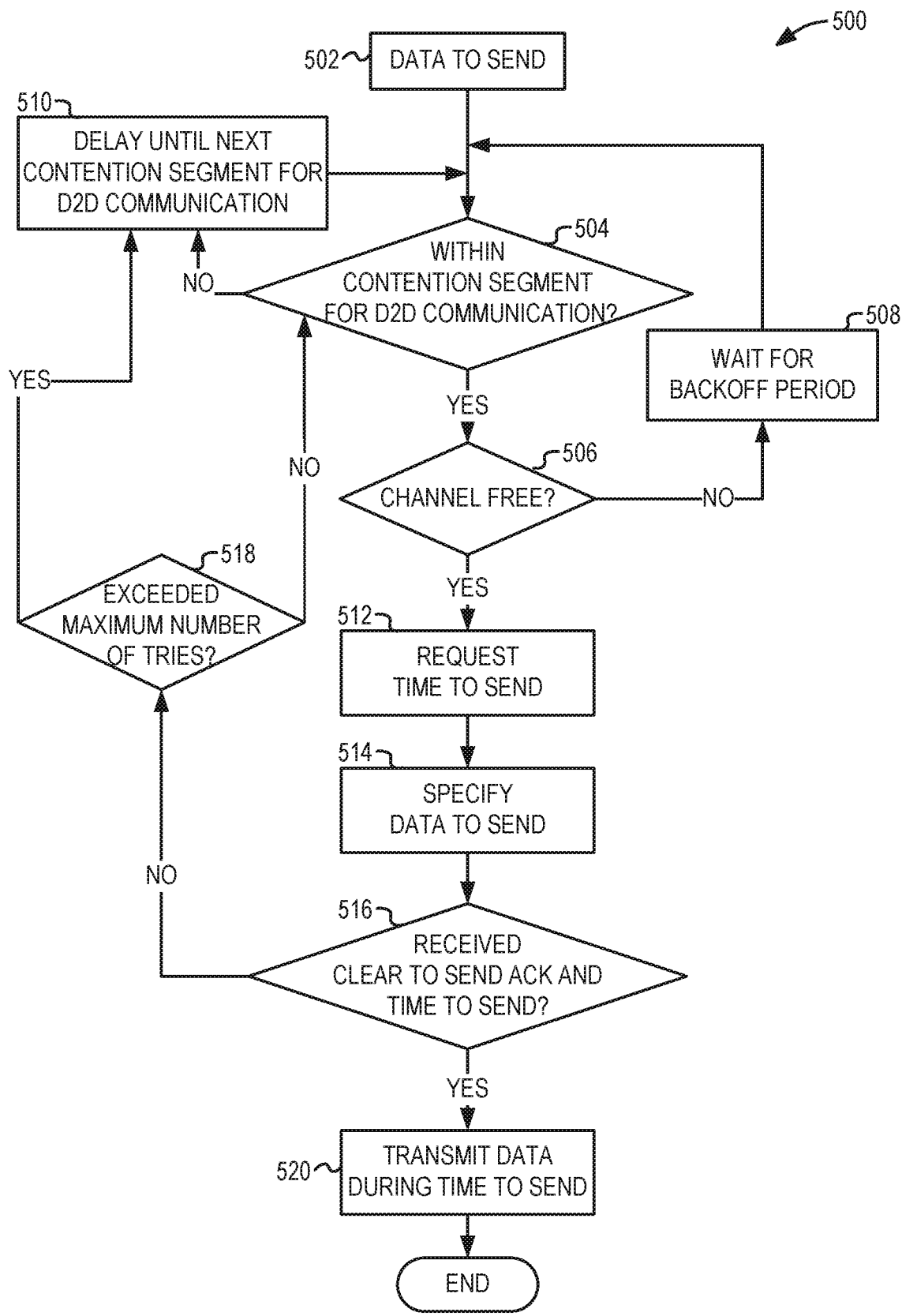
FIG. 5 illustrates a flowchart for a wireless communication device to perform a D2D communication using a contention and scheduled communication procedure according to a further described example.

FIG. 5 illustrates a flowchart 500 for a device to schedule a D2D communication using a contention procedure according to some embodiments. As shown in operation 502, a transmitting wireless communication device has data to send via a D2D communication. In decision 504, a determination is made whether the contention segment (e.g., window) for the D2D communication is ongoing. If not, the data transmission may be delayed until the next contention segment for D2D communications (operation 510).

If as a result (of decision 504) the contention segment for the D2D communication is ongoing, a determination is made whether the wireless channel is free (decision 506). If the channel is not free, the data transmission is delayed for at least a backoff period (operation 508). If the channel is free, the device may proceed with transmitting a request for scheduled data resources (operation 512), and a specification of the size or other attributes of the data to send (operation 514). A determination is then made whether the transmitting wireless communication device receives a clear-to-send acknowledgement and a time to send within a period of time (decision 516). If no clear-to-send acknowledgment has been received within a period of time, then a determination is made whether the number of times that the request was transmitted exceeds a maximum number of attempts (decision 518). If the maximum number of attempts is not exceeded, then the contention process is repeated (decision 504); if the maximum number of attempts is exceeded, then the D2D communication is delayed until a next contention segment (operation 510). If, however, the clear-to-send acknowledgment and the time to send are successfully received, then the data transmission may occur during the designated time to send (operation 520).

Figure 6A:
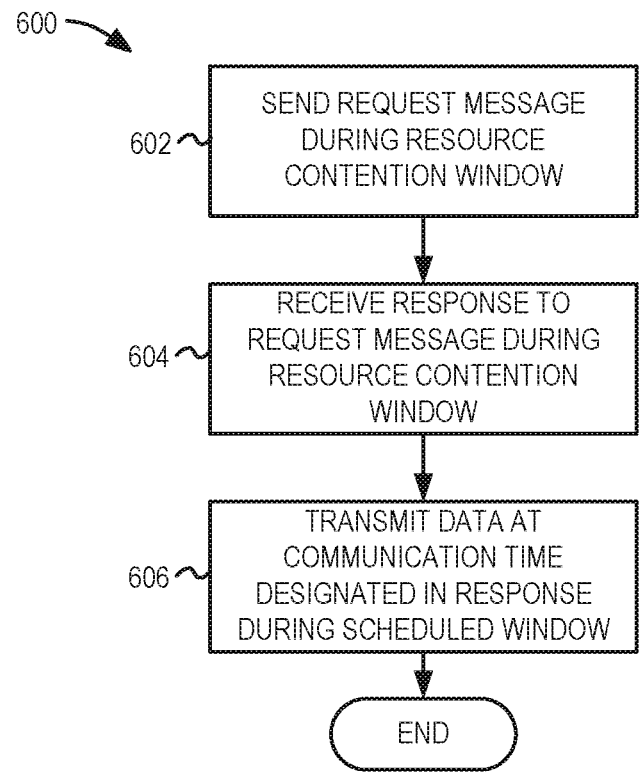
FIG. 6A illustrates an example method for facilitating D2D channel access for a D2D data transmission according to a further described example.

FIG. 6A illustrates a flowchart 600 of an example method for controlling D2D channel access of a D2D data transmission, from a transmitting device with a series of time windows, according to a further described example. As depicted, in operation 602, a transmitting device sends a request message during a resource contention window of the D2D time-frequency zone. The transmission of the request message may be delayed based on a backoff counter, detection of use of the contention channel, randomized access times, waiting periods, or other collision avoidance mechanisms.

In operation 604, still during the resource contention window, the transmitting device receives a response to the request message originating from the receiving device. The response includes a designated communication time for use during a scheduled window of the D2D time-frequency zone.

In operation 606, during the scheduled window of the D2D time-frequency zone, the data will be transmitted at the designated communication time. Various scheduling and re-scheduling mechanisms may be employed within the D2D time-frequency zone (or in another D2D time-frequency zone) to re-transmit the data upon failure or interruption of the data transmission, or lack of acknowledgment. The data transmission is then processed by the receiving device upon the successful receipt.

Figure 6B:
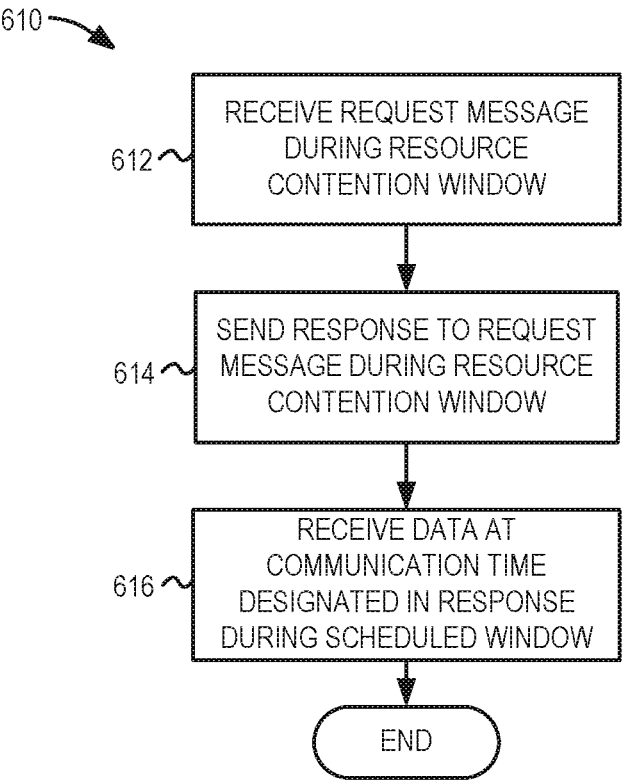
FIG. 6B illustrates an example method for facilitating D2D channel access for a D2D data reception according to a further described example.

FIG. 6B illustrates a flowchart 610 of an example method for controlling D2D channel access of a D2D data reception at a receiving device according to a further described example. As depicted, in operation 612, a receiving device receives a request message during a resource condition window of the D2D time-frequency zone. The receipt of the request message may indicate the size of requested data transmission and other communication parameters as necessary to arrange scheduling.

In operation 614, still during the resource contention window, the receiving device transmits a response to the request message for receipt by the transmitting device. The response includes a designated communication time for use during a scheduled window of the D2D time-frequency zone.

In operation 616, during the scheduled window of the D2D time-frequency zone, the data will be received from the transmitting device starting at the designated communication time. The data transmission may be further processed by the receiving device upon the successful receipt, and an acknowledgment may be sent in response to receipt of the data.

The techniques and configurations described herein may be extended to operate in other configurations. For example, the techniques may be used in connection with a peer-to-peer or point-to-point network which involves connections over a plurality of devices (e.g., connections involving multiple hops). The techniques may also be used in connection with a standardized protocol defining response messages formats, timing, and conditions. Thus, implementations of the presently described contention and scheduling techniques are not limited to implementations with a 3GPP standard, but may also extend to device-to-device, peer-to-peer, point-to-point, machine-to-machine, and distributed networks in accordance with IEEE 802.11 standards, IEEE 802.16 standards, and the like.

Functionality for the present technique may be incorporated in components or modules in a computing system (including a mobile device), a wireless network adapter, a wireless transceiver control, circuitry for such systems and devices, and in hardware and software implementations. Further, various methods or techniques, or certain aspects or portions of the functionality described herein, may take the form of program code (i.e., instructions) embodied in tangible media, such as flash memory, CD/DVD-ROMs, hard drives, portable storage devices, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
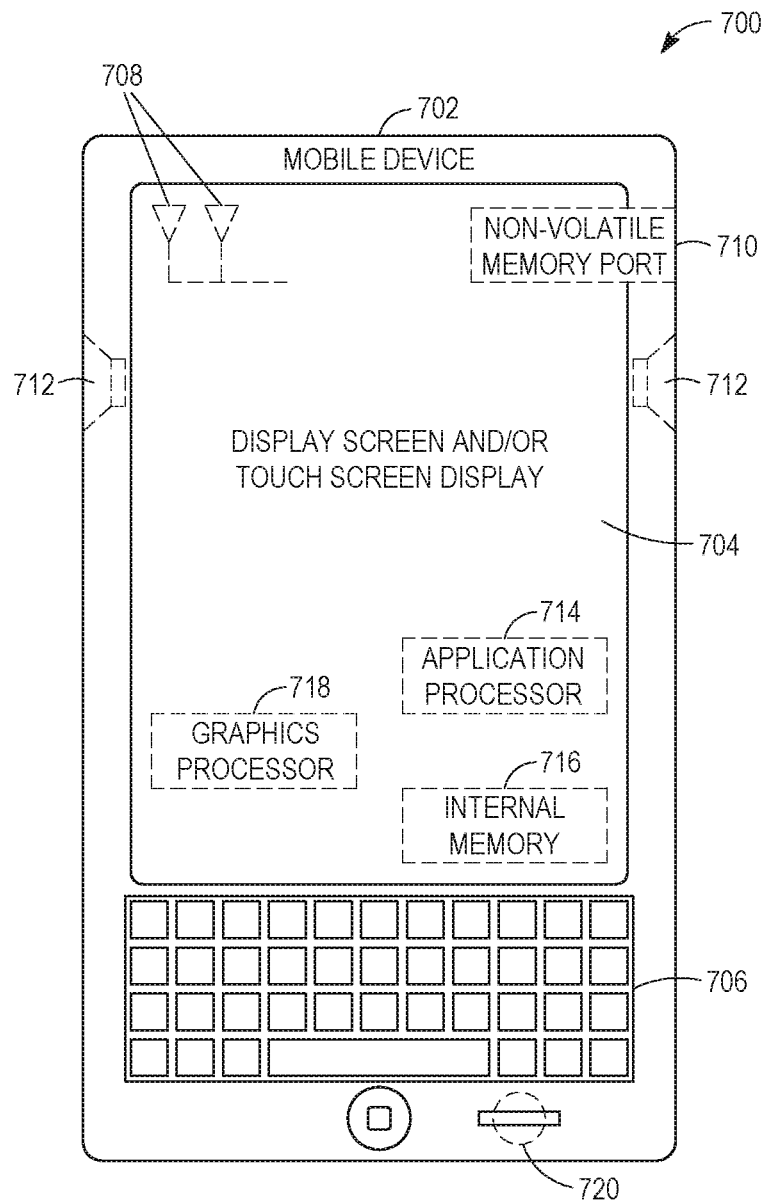
FIG. 7 illustrates an example mobile device on which the configurations and techniques described herein may be deployed.

FIG. 7 provides an example illustration of a mobile device 700, such as a UE, a mobile station (MS), a mobile wireless device, a mobile communication device, a tablet, a handset, or other type of mobile wireless device. The mobile device 700 may include one or more antennas 708 within housing 702 that are configured to communicate with a base station (BS), an eNodeB, or other type of wireless wide area network (WWAN) access point. The mobile device 700 may be configured to communicate using at least one wireless communication standard including 3GPP LTE, WiMAX, High Speed Packet Access (HSPA), Bluetooth (the term "Bluetooth" as used herein referring to a short-range digital communication protocol including a short-haul wireless protocol frequency-hopping spread-spectrum (FHSS) communication technique operating in the 2.4 GHz spectrum), and Wi-Fi. The mobile device 700 may communicate using separate antennas for each wireless communication standard or shared antennas for multiple wireless communication standards. The mobile device 700 may communicate in a wireless local area network (WLAN), a wireless personal area network (WPAN), and/or a WWAN.

FIG. 7 also provides an illustration of a microphone 720 and one or more speakers 712 that may be used for audio input and output from the mobile device 700. The display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen.

Figure 8:
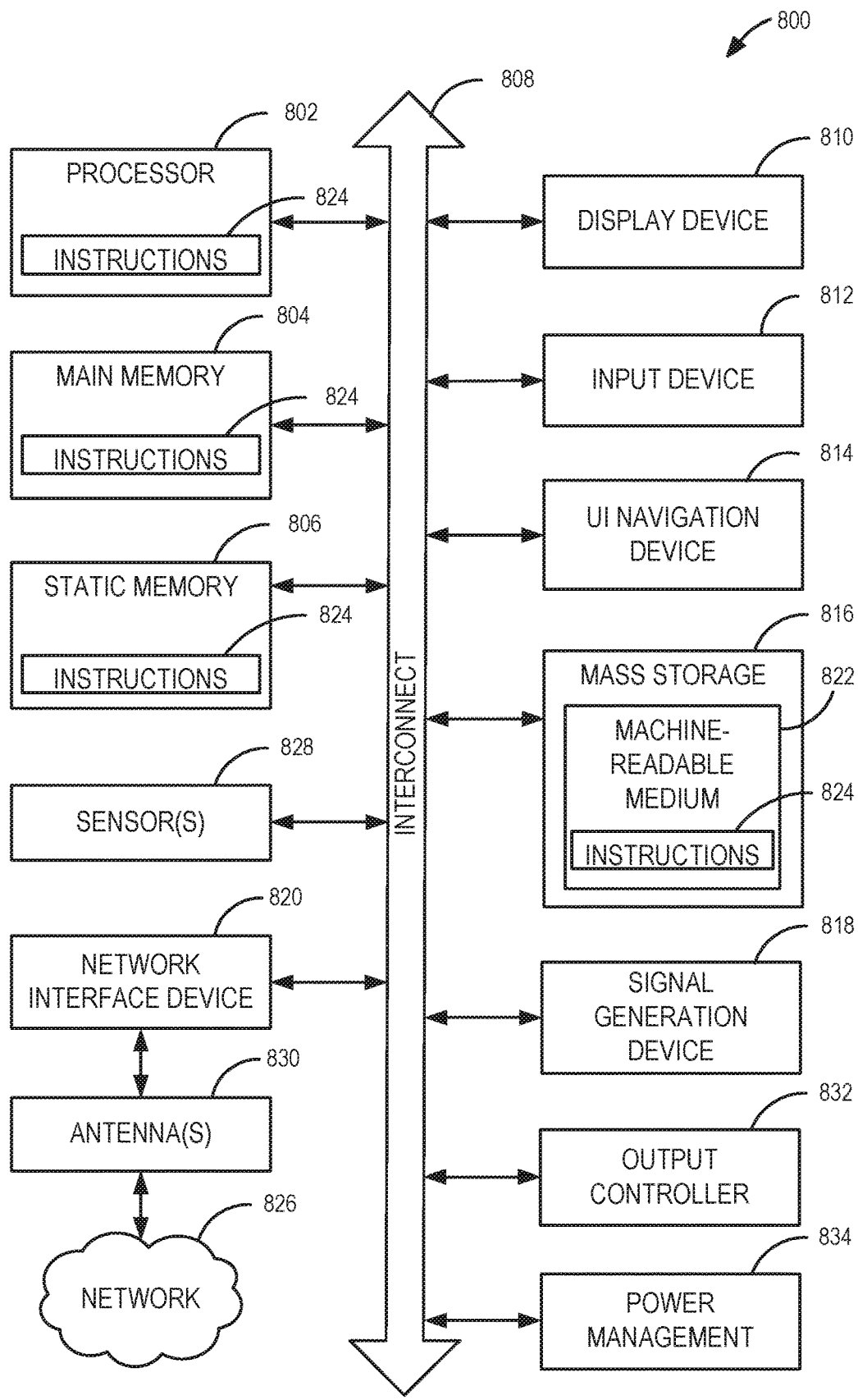
FIG. 8 illustrates an example computer system that may be used as a computing platform for the computing devices described herein.

FIG. 8 is a block diagram illustrating an example computer system machine upon which any one or more of the methodologies herein discussed may be run. Computer system 800 may be embodied as the computing device 104, mobile device 106, mobile device 700 (from FIGS. 1 and 7), or any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system 800 may additionally include a storage device 816 (e.g., a drive unit), a signal generation device 818 (e.g., a speaker), an output controller 832, a power management controller 834, and a network interface device 820 (which may include or operably communicate with one or more antennas 830, transceivers, or other wireless communications hardware), and one or more sensors 828, such as a Global Positioning System (GPS) sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a LAN, WAN, the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of PANs, LANs, and WANs, using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes the subject matter embodied by a wireless communication device (e.g., a UE), comprising processing circuitry arranged to communicate with an evolved Node B (eNodeB) using a 3GPP Long Term Evolution (LTE) or Long Term Evolution-Advanced (LTE-A) network connection and to facilitate device-to-device communications with a receiving UE using a direct network connection, by performing operations to: send a request message to a receiving UE, during a resource contention window, the resource contention window allocated for scheduling device-to-device communications in a wireless channel using a contention channel access technique, the request message indicating a size for a data transmission; receive a response to the request message, from the receiving UE, the response confirming the request message and designating a transmission time for the data transmission, and the designated transmission time occurring within a scheduled transmission window allocated for conducting the device-to-device communications; and perform the data transmission with the receiving UE, during the scheduled transmission window allocated for conducting the device-to-device communications, on the wireless channel at the designated transmission time.

In Example 2, the subject matter of Example 1 can optionally include the processing circuitry being further arranged to perform operations to: maintain a low-power mode at the wireless communication device, beginning at a start of the scheduled transmission window until the designated transmission time.

In Example 3, the subject matter of one or any combination of Examples 1-2 can optionally include the processing circuitry being further arranged to perform operations to: perform a contention channel access technique to obtain access to the wireless channel during the resource contention window, the contention channel access technique including obtaining a backoff time for contention during the resource contention window, and waiting for the backoff time to expire, prior to sending the request message during the resource contention window.

In Example 4, the subject matter of one or any combination of Examples 1-3 can optionally include the processing circuitry being further arranged to perform operations to: resend the request message during the resource contention window in response to the request message not being acknowledged by the receiving device within a period of time.

In Example 5, the subject matter of one or any combination of Examples 1-4 can optionally include the resource contention window and the scheduled transmission window being allocated in subframes for an uplink period defined in a carrier network.

In Example 6, the subject matter of one or any combination of Examples 1-5 can optionally include the uplink period being defined in the carrier network according to a standard provided from a 3GPP Long Term Evolution (LTE) or Long Term Evolution-Advanced (LTE-A) standards family.

In Example 7, the subject matter of one or any combination of Examples 1-6 can optionally include the resource contention window and the scheduled transmission window being allocated for peer-to-peer communications among devices according to a standard from an IEEE 802.11 standards family, or for machine-to-machine communications among devices according to a standard from an IEEE 802.16 standards family.

In Example 8, the subject matter of one or any combination of Examples 1-7 can optionally include the resource contention window and the scheduled transmission window occurring in a zone allocated for the device-to-device communications in a wireless channel, wherein a size of the resource contention window relative to the scheduled transmission window is configured to change based on characteristics of one or more data transmissions requested during the resource contention window.

Example 9 can include, or can optionally be combined with all or portions of the subject matter of one or any combination of Examples 1-8 to include a method performed by a dual-mode user equipment (UE) for facilitating device-to-device communications with a receiving wireless communications device, the dual-mode UE configured for communications with a carrier-based network in addition to the device-to-device communications, and the method comprising: accessing a wireless channel using a contention channel access technique, within a resource contention window allocated for scheduling device-to-device communications in a wireless channel, the resource contention window occurring during a device-to-device communications period indicated by a carrier-based network; transmitting a request message to the receiving communications device, within the resource contention window, to obtain a designated transmission time for a device-to-device data transmission; and conducting the device-to-device data transmission from the transmitting communications device to the receiving communications device at the designated transmission time, within a scheduled transmission window allocated for performing for the device-to-device communications in the wireless channel, the scheduled transmission window occurring during a device-to-device communications period indicated by the carrier-based network.

In Example 10, the subject matter of Example 9 can optionally include conducting a sleep mode within the scheduled transmission window; and interrupting the sleep mode within the scheduled transmission window to conduct the device-to-device data transmission.

In Example 11, the subject matter of one or any combination of Examples 9-10 can optionally include the contention access technique including obtaining a backoff time for contention within the resource contention window, and waiting for the backoff time to expire, prior to transmitting the request message within the resource contention window.

In Example 12, the subject matter of one or any combination of Examples 9-11 can optionally include the resource contention window and the scheduled transmission window being allocated in one or more subframes for a scheduled uplink period defined for a carrier network, and wherein the scheduled uplink period is an uplink period established by a carrier network operating according to a standard provided from a 3GPP Long Term Evolution (LTE) or Long Term Evolution-Advanced (LTE-A) standards family.

Example 13 can include, or can optionally be combined with all or portions of the subject matter of one or any combination of Examples 1-12 to include User Equipment (UE) comprising: a transceiver comprising circuitry including physical layer circuitry and media-access control layer circuitry, the circuitry arranged to establish device to device channel access in a wireless communication medium, by performing operations to: receive a request message, from a transmitting device, to conduct a data transmission during a resource contention window, the resource contention window being allocated for wireless device-to-device communications, the request message indicating a size for a data transmission and being sent from the transmitting device on the wireless communication medium using a contention-based technique; send a response to the request message, the response confirming the request message and designating a time for the data transmission, the transmission time occurring within a scheduled transmission window allocated for the wireless device-to-device communications; and receive the data transmission from the transmitting device via the wireless communication medium at the designated time, during the scheduled transmission window allocated for the wireless device-to-device communications; wherein the resource contention window and the scheduled transmission window are allocated for the wireless device-to-device communications according to timing designated by a network controlled by an evolved Node B (eNodeB).

In Example 14, the subject matter of Example 13 can optionally include the circuitry being further arranged to perform operations to: maintain, from the transmitting device, a low-power mode beginning at a start of the scheduled transmission window until the designated time.

In Example 15, the subject matter of one or any combination of Examples 13-14 can optionally include the circuitry being further arranged to perform operations to: obtain a backoff time for contention during the resource contention window, and waiting for the backoff time to expire, prior to sending the response to the request message, wherein the response to the request message is sent during the resource contention window.

In Example 16, the subject matter of one or any combination of Examples 13-15 can optionally include the circuitry being further arranged to perform operations to: provide an acknowledgement of data received from the transmitting device in response to the data transmission.

In Example 17, the subject matter of one or any combination of Examples 13-16 can optionally include the resource contention window and the scheduled transmission window being allocated in time slots for a scheduled uplink period defined for a carrier network provided from the eNodeB.

In Example 18, the subject matter of one or any combination of Examples 13-17 can optionally include the scheduled uplink period being an uplink period defined according to a standard provided from a 3GPP Long Term Evolution (LTE) or Long Term Evolution-Advanced (LTE-A) standards family.

Example 19 can include, or can optionally be combined with all or portions of the subject matter of one or any combination of Examples 1-18 to include a method for facilitating device to device communications with a transmitting device, comprising: processing a request message to conduct a data transmission during a resource contention window and obtain a time of transmission for the data transmission, the request message indicating a size for the data transmission and being sent from the transmitting device over a wireless medium using a contention channel access technique to access the wireless medium; transmitting a response to the request message, the response confirming the request message and designating a transmission time for the data transmission, the transmission time designated within a scheduled transmission window; and processing the data transmission from the transmitting device on the wireless channel received at a designated communication time during the scheduled transmission window; wherein the scheduled transmission window and the resource contention window are designated by an evolved Node B (eNodeB) for performance of wireless device-to-device communications on the wireless medium.

In Example 20, the subject matter of Example 19 can optionally include conducting a sleep mode during the scheduled transmission window; and interrupting the sleep mode during the scheduled transmission window to conduct the data transmission.

In Example 21, the subject matter of one or any combination of Examples 19-20 can optionally include the response to the request message being transmitted via the wireless medium in connection with the contention channel access technique, wherein the contention channel access technique includes obtaining a backoff time for contention during the resource contention window, and waiting for the backoff time to expire, prior to transmitting the response to the request message during the resource contention window.

In Example 22, the subject matter of one or any combination of Examples 19-21 can optionally include the resource contention window and the scheduled transmission window being allocated for a scheduled uplink period defined for a network operating according to a standard provided from a 3GPP Long Term Evolution (LTE) or Long Term Evolution-Advanced (LTE-A) standards family.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a first user equipment (UE) configured for communication in a carrier network system, the apparatus comprising: memory; and processing circuitry, the processing circuitry configured to:
    decode uplink/downlink (UL/DL) configuration information indicating UL subframes of a communication frame that are configured as a Device-to-Device (D2D) segment for D2D communication among a plurality of UEs;
    decode resource configuration information that allocates a first portion of the UL subframes of the D2D segment to be used to exchange D2D control information among the plurality of UEs and that allocates a second portion of UL subframes of the D2D segment to be used to exchange data among the plurality of UEs;
    identify, using data in the first portion of the UL subframes of the D2D segment, a second UE of the plurality of UEs;
    encode data in the first portion of the D2D segment the encoded data indicating of a first set of resources in the second portion of the D2D segment to be used by the second UE for D2D direct transmission data;
    decode the D2D direct transmission data from the second UE using a resource unit within the first set of resources;
    randomly select a second set of resources in the second portion of the UL subframes of the D2D segment;
    encode data indicating the second set of resources in the first portion of the D2D segment for transmission to the second UE; and
    encode data for direct transmission to the second UE using a further resource unit within the second set of resources,
    wherein the memory is configured to store the uplink/downlink (UL/DL) configuration information.

2. The apparatus of claim 1, wherein the first set of resources corresponds to a reception time and the processing circuitry is further configured to maintain the first UE in a low-power mode until the reception time.

3. The apparatus of claim 1, wherein the processing circuitry is further configured to encode a request to transmit a message using a further resource unit in the first portion of the UL subframes of the D2D segment, the request to transmit the message identifying the second UE.

4. The apparatus of claim 1, wherein the random selection of the second set of resources in the second portion of the UL subframes of the D2D segment comprises randomly selecting an offset from a last subframe of the first portion of the UL subframes of the D2D segment.

5. The apparatus of claim 1, wherein the processing circuitry is further configured to decode a message received in the first portion of the UL subframes of the D2D segment, the decoded message including a request to transmit data to the first UE.

6. The apparatus of claim 1, wherein the processing circuitry is configured to decode the resource configuration information provided by a base station or an enhanced NodeB (eNB).

7. The apparatus of claim 1 wherein the processing circuitry comprises a baseband processor.

8. A non-transitory computer-readable storage medium that stores instructions for execution by processing circuitry of a first user equipment (UE) to configure the processing circuitry to perform operations to:
    decode uplink/downlink (UL/DL) configuration information indicating UL subframes of a communication frame that are configured as a Device-to-Device (D2D) segment for D2D communication among a plurality of UEs;
    decode resource configuration information that allocates a first portion of the UL subframes of the D2D segment to be used to exchange D2D control information among the plurality of UEs and that allocates a second portion of UL subframes of the D2D segment to be used to exchange data among the plurality of UEs;
    identify, using data in the first portion of the UL subframes of the D2D segment, a second UE of the plurality of UEs;
    encode data in the first portion of the D2D segment the encoded data indicating of a first set of resources in the second portion of the D2D segment to be used by the second UE for D2D direct transmission data;
    decode the D2D direct transmission data from the second UE using a resource unit within the first set of resources; and
    randomly select a second set of resources in the second portion of the UL subframes of the D2D segment, wherein the random selection of the second set of resources in the second portion of the UL subframes of the D2D segment comprises randomly selecting an offset from a last subframe of the first portion of the UL subframes of the D2D segment.

9. The non-transitory computer-readable storage medium of claim 8, wherein the first set of resources corresponds to a reception time and the instructions further configure the processing circuitry to maintain the first UE in a low-power mode until the reception time.

10. The non-transitory computer-readable storage medium of claim 8, wherein the instructions further configure the processing circuitry to encode a request to transmit a message using a resource in the first portion of the UL subframes of the D2D segment, the request to transmit the message identifying the second UE.

11. The non-transitory computer-readable storage medium of claim 8, wherein the instructions further configure the processing circuitry to:
    encode data indicating the second set of resources in the first portion of the UL subframes of the D2D segment for transmission to the second UE; and encode data for direct transmission to the second UE using a further resource unit within the second set of resources.

12. The non-transitory computer-readable storage medium of claim 8, wherein the instructions further configure the processing circuitry to decode a message received in the first portion of the UL subframes of the D2D segment, the decoded message including a request to transmit data to the first UE.

13. The non-transitory computer-readable storage medium of claim 8, wherein the instructions further configure the processing circuitry to decode the resource configuration information provided by a base station or an enhanced NodeB (eNB).

14. A method for a first UE to communicate with a second UE using device-to-device (D2D) communication, the method comprising:
   decoding uplink/downlink (UL/DL) configuration information indicating UL subframes of a communication frame that are configured as a D2D segment for D2D communication between the first and second UEs;
   decoding resource configuration information that allocates a first portion of the UL subframes of the D2D segment to be used to exchange D2D control information between the first and second UEs and that allocates a second portion of UL subframes of the D2D segment to be used to exchange data between the first and second UEs;
   identifying the second UE using data in the first portion of the UL subframes of the D2D segment;
   encoding data in the first portion of the D2D segment the encoded data indicating of a first set of resources in the second portion of the D2D segment to be used by the second UE for D2D direct transmission data;
   decoding the D2D direct transmission data from the second UE using a resource unit within the first set of resources;
   randomly selecting a second set of resources in the second portion of the UL subframes of the D2D segment;
   encoding data indicating the second set of resources in the first portion of the UL subframes of the D2D segment for transmission to the second UE; and
   encoding data for direct transmission to the second UE using a further resource unit within the second set of resources.

15. The method of claim 14, wherein the first set of resources corresponds to a reception time and the method further comprises maintaining the first UE in a low-power mode until the reception time.

16. The method of claim 14, wherein further comprising encoding a request to transmit a message using a further resource unit in the first portion of the UL subframes of the D2D segment, the request to transmit the message identifying the second UE.

* * * * *